May 6, 1958     J. A. KRIVA ET AL     2,833,108
BALE DROPPING CHUTE FOR PICK-UP HAY BALERS
Filed March 16, 1954     2 Sheets-Sheet 1
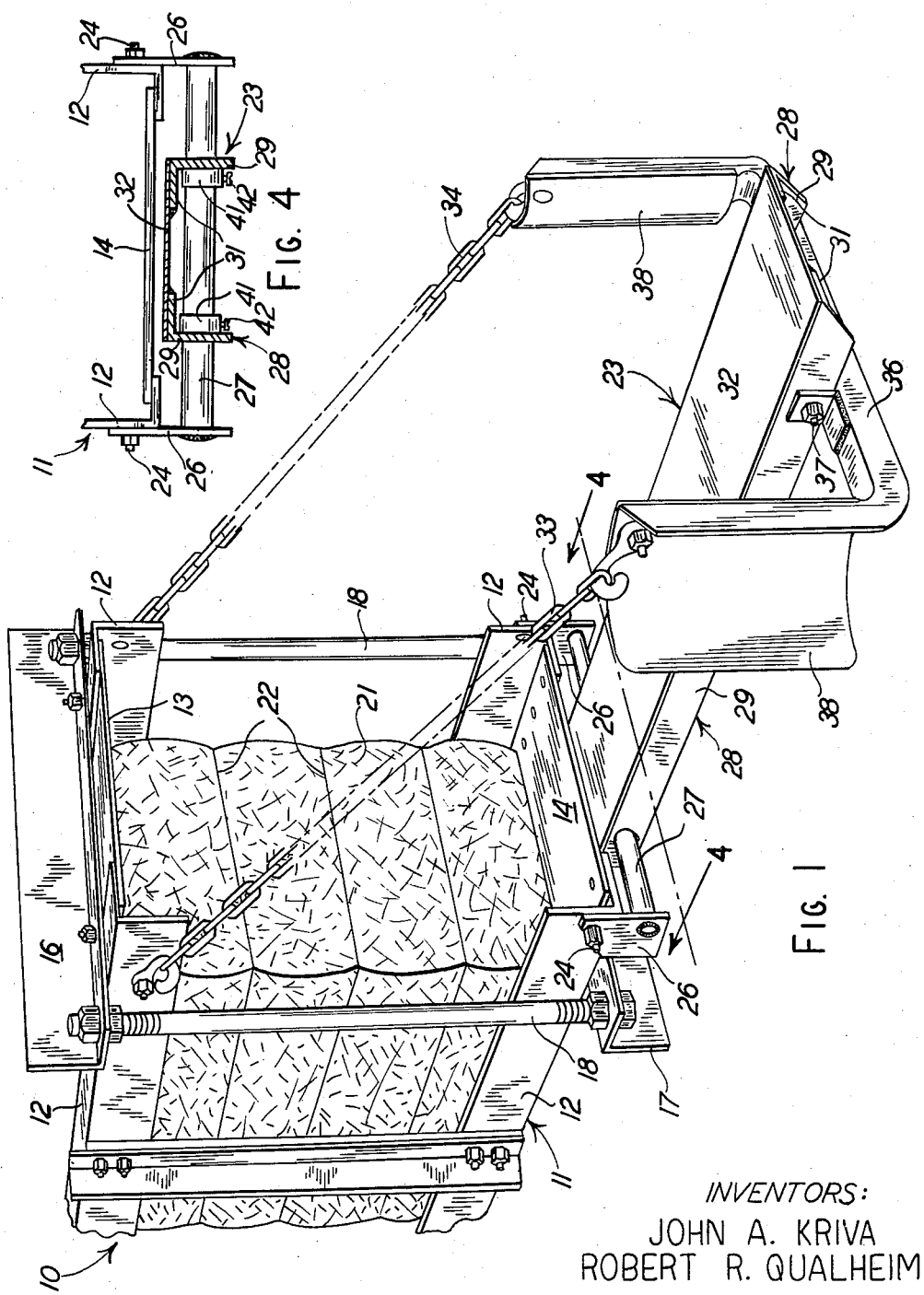
INVENTORS:
JOHN A. KRIVA
ROBERT R. QUALHEIM
BY:
ATTORNEY May 6, 1958     J. A. KRIVA ET AL     2,833,108
BALE DROPPING CHUTE FOR PICK-UP HAY BALERS
Filed March 16, 1954     2 Sheets-Sheet 2
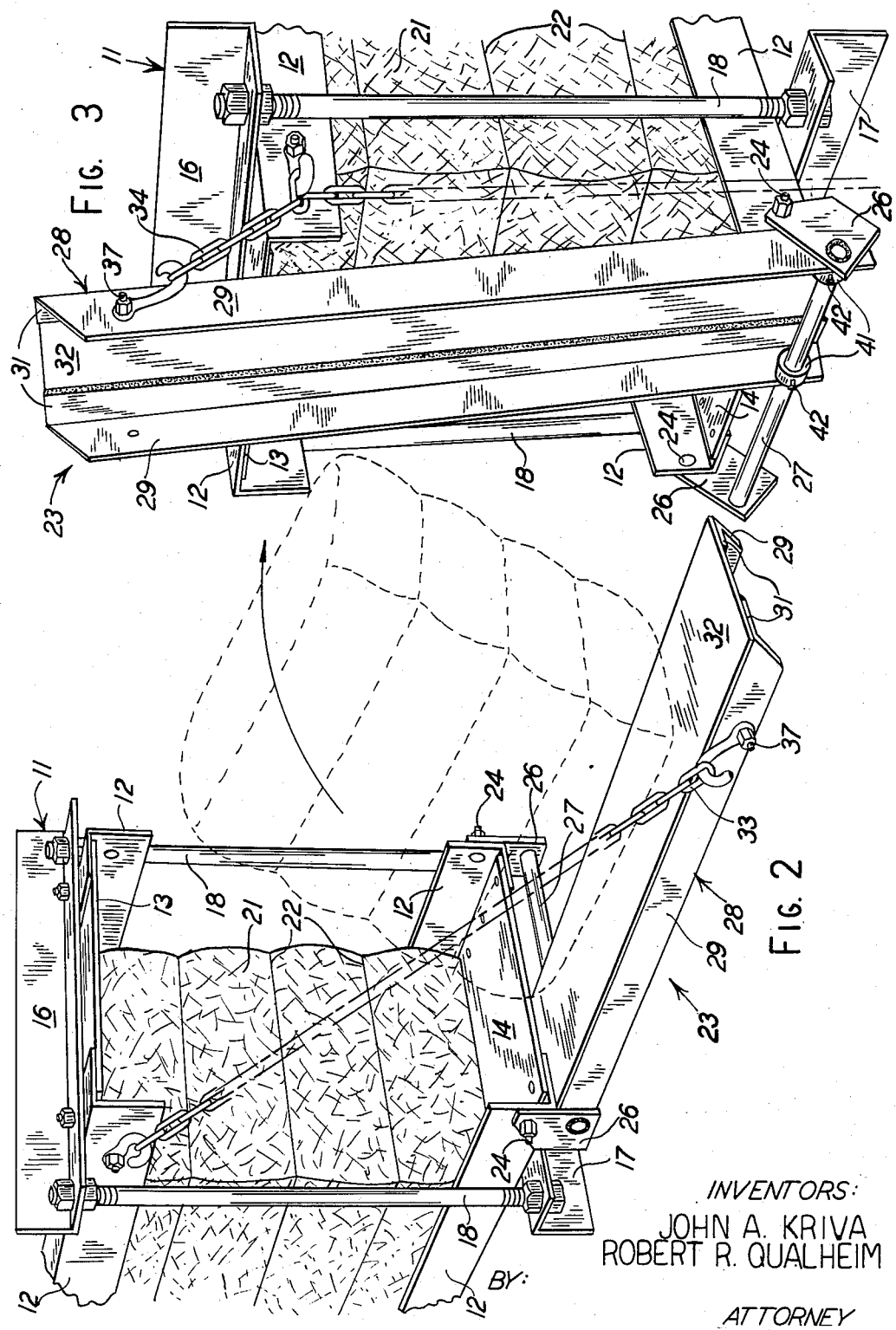
INVENTORS:
JOHN A. KRIVA
ROBERT R. QUALHEIM
BY:
ATTORNEY United States Patent Office 2,833,108
Patented May 6, 1958

2,833,108

BALE DROPPING CHUTE FOR PICK-UP HAY BALERS

John A. Kriva and Robert R. Qualheim, Racine, Wis., assignors to J. I. Case Company, Racine, Wis.

Application March 16, 1954, Serial No. 416,656

1 Claim. (Cl. 56—473.5)

This invention relates to baling machines, and, more particularly, it relates to the platform used in baling machines for delivering bales onto the ground and it also relates to a process of handling bales.

When baling hay and picking up the finished bales with the modern machinery available, it is sometimes found necessary to position the bales in rows on the field prior to picking them up. Bale pickup machines then usually grip the bales on the two side surfaces of the bales. The method of gripping is positive so that there will be no slipping of the bale on the pickup elevator.

However, it is desired that the pickup means be applied to a surface of the bales where there are no baling wires because if the pickup fingers come into contact with the wire, they may nick it sufficiently so as to weaken it. This often results in a bale that breaks open upon handling. If, however, bales are dumped with their wires vertically disposed, then the wires are not touched in the pickup process as two opposite sides are free of wires.

Bale pickup machines are made in various designs, some picking up the bale from the left and some from the right, and it is therefore necessary to provide a means for dumping the bales at will either to the right or to the left of the bale case, or directly to the rear in some instances.

It is also desirable in some instances to deposit the bales in such a position that sufficient room will remain between the row of bales and the next windrow to be picked up. Obviously, if this is not done, the next windrow may be so close that the baler cannot pick the windrow up without interfering with the row of bales. Also, another problem is that at times bales are unevenly compressed and the baling wire then causes the bale to be curved about its vertical axis and thus have a bowed shape as viewed from the top.

It is an object of this invention to so position the bales as to allow sufficient space for the transportation of the baler.

Another object is to deposit the bales onto the ground so that the mechanical bale pickup machine will not damage the wires as the bales are being picked up.

Another object of this invention is to effect a process which will position bales onto the ground with the wires in a vertical plane.

It is a further object of this invention to achieve the foregoing objects by a relatively simple modification of presently known baling machines.

Still another object is to provide a baling machine which will deposit bales onto the ground on either side of the bale chamber.

Other objects and advantages will become apparent upon reading the following description in conjunction with the accompanying drawings, in which, Figure 1 is a fragmentary perspective view of the discharge end of a baling machine incorporating a preferred embodiment of this invention.

Fig. 2 is a fragmentary perspective view of substantially the embodiment shown in Fig. 1 but with the parts in a different position.

Fig. 3 is a fragmentary perspective view of substantially the embodiment shown in Fig. 1 but with the parts in a second different position.

Fig. 4 is a fragmentary sectional view taken on the line 4—4 of Fig. 1.

Similar reference numerals refer to similar parts throughout the several views.

As shown in Fig. 1, there is a section of a baling machine 10 having a baler frame 11 composed of four horizontally extended angle irons 12 which are spaced apart to define a bale chamber. Horizontally disposed sheets 13 and 14 are suitably attached to the upper and lower pairs of the angles 12 to respectively form a chamber top and floor. In the embodiment shown, there is also provided transversely attached angle irons 16 and 17 across the top and bottom, respectively at the end of the baler frame 11. Also, a pair of vertical rods 18 are threadedly attached between the extending ends of the angles 16 and 17 to further secure the baler frame assembly.

Shown positioned within the baler frame 11 is a bale 21 bound by baling ties or wire 22 or the like. It should be understood that in actual baling operation, the bale 21 must be removed from the baler frame and deposited onto the ground. To this end, the bale will be pushed from the baler frame by the baling plunger and the following bale which are not shown.

Secured at the outlet end of the baler frame 11 is an adjustable platform generally designated 23. The platform forms an extension to the floor 14 of the chamber and is connected to the baler frame by a pair of bolts 24 which are horizontally disposed and attached to the vertical sides of the two bottom angles 12 to support a pair of depending and oppositely disposed hanger plates or brackets 26 located on the outside of the angles 12. The plates 26 also are each provided with a suitable opening in their lower ends to receive a horizontally attached hanger rod or pipe 27 which extends transverse to the longitudinal axis of the baler frame 11 to provide a support member for the platform 23. Mounted on the rod 27 is a pair of spaced apart and longitudinally extending angle brackets 28 which contain vertical sides 29 and horizontal top sides 31. The sides 29 are each provided with an opening through which the rod 27 is loosely received. The top sides 31 provide a support for a horizontally extending floor or sheet 32 which is welded or otherwise suitably attached to the angles 28 to form the platform assembly. In this manner, the platform is attached to the baler frame 11 to permit vertical pivotal movement, with the bolts 24 forming the pivot point. It should be noted that the platform is approximately one-half the width of the floor 14 and is centrally positioned with respect to the floor.

To maintain the platform in the horizontal position, a pair of support chains 33 and 34 is attached to the upper pair of angles 12 to extend downwardly therefrom and connect to the outer end of the platform. In the embodiment shown in Fig. 1, the chains attach to a bifurcated angle bar 36 which is bolted onto the ends of the platform angles 28 by bolts 37. The upright ends of the bar 36 each carry a flare sheet 38 as shown.

With the foregoing descibted construction, the bale 21 will move from the baler frame 11 and onto the platform 23. The chains 33 and 34 provide side guides to maintain the bale on the platform and the flare sheets 38 do likewise. With this arrangement, the bale is deposited onto the ground off the end of the platform and with the vertical axis remaining vertical which means the baling wire remains in a horizontal plane just as it is shown in its position on the bale in Fig. 1.

When it is desired to move the platform to one side or the other of the baler frame 11, then it is preferred that the bifurcated bar 36 and the attached flare sheets be removed from the platform by removing the bolts 37. The chains are then released and one is preferably attached to the platform at the point where the bolt 37 was positioned. As shown in Fig. 2, the platform is in a position to one extreme side with respect to the bale chamber and with one lateral edge in substantial alignment with the longitudinal center of the chamber floor. This leaves the opposite side without a platform, and, when the bale 21 moves onto the platform, it will not be balanced and will tip off in the manner shown by the dotted lines of Fig. 2. When the bale reaches the ground, it will then be in a position with its vertical axis horizontal as the bale is disposed on its side, which means the bale wire strands are in a vertical plane.

Fig. 3 shows the position of the platform offset to the side opposite from that of Fig. 2 with the opposite lateral edge of the platform in substantial alignment with the longitudinal center of the chamber floor and with the platform raised up to a transport position. Here it will be seen that there is preferably provided a pair of collars 41 which are loosely mounted on the rod 27 inside the angles 28. The collars are sufficiently loose to permit sliding them axially along the rod 27. An adjustable set screw 42 is then provided to thread through the collar and abut the rod to secure the collar in a set position when the screw is tightened. Fig. 4 shows the relation of the rod, the collars, and the set screws.

From this arrangement, it will be apparent that the platform may be selectively positioned along the rod 27 so that bales can be deposited onto the ground directly in rear of the baler in substantial alignment with the longitudinal center thereof or to a selected side of a line through said center. All that is required is a quickly and easily accomplished adjustment of the baling machine platform.

A specific embodiment of this invention has been shown and described, however, it will be obvious from the specification that numerous changes could be made and, therefore, the scope of this invention should be limited only by the appended claim.

We claim:

In a baling machine of the type having a baler frame defining a baling chamber, a floor for said chamber of substantially the width of the chamber, a delivery platform of substantially one-half the width of said floor extending rearwardly from the floor, a pair of brackets pivotally depending from said frame, a rod mounted on said brackets to extend transversely of and below the frame, the platform being slidably mounted on said rod to selectively position the platform with the longitudinal centers of the platform and floor in substantial alignment or with either selected lateral edge of the platform in substantial alignment with the longitudinal center of the floor so as to selectively cause bales delivered from the baler to fall along its longitudinal center line or to either selected side of said center line, and coacting means on the frame and platform to maintain the latter in a horizontal position.

References Cited in the file of this patent

UNITED STATES PATENTS

| | | |
|---|---|---|
| 181,632 | Brock | Aug. 29, 1876 |
| 2,617,353 | Ranney | Nov. 11, 1952 |
| 2,625,002 | Prechel | Jan. 13, 1953 |
| 2,660,855 | Voight | Dec. 1, 1953 |
| 2,722,096 | Tice et al. | Nov. 1, 1955 |